UNITED STATES PATENT OFFICE.

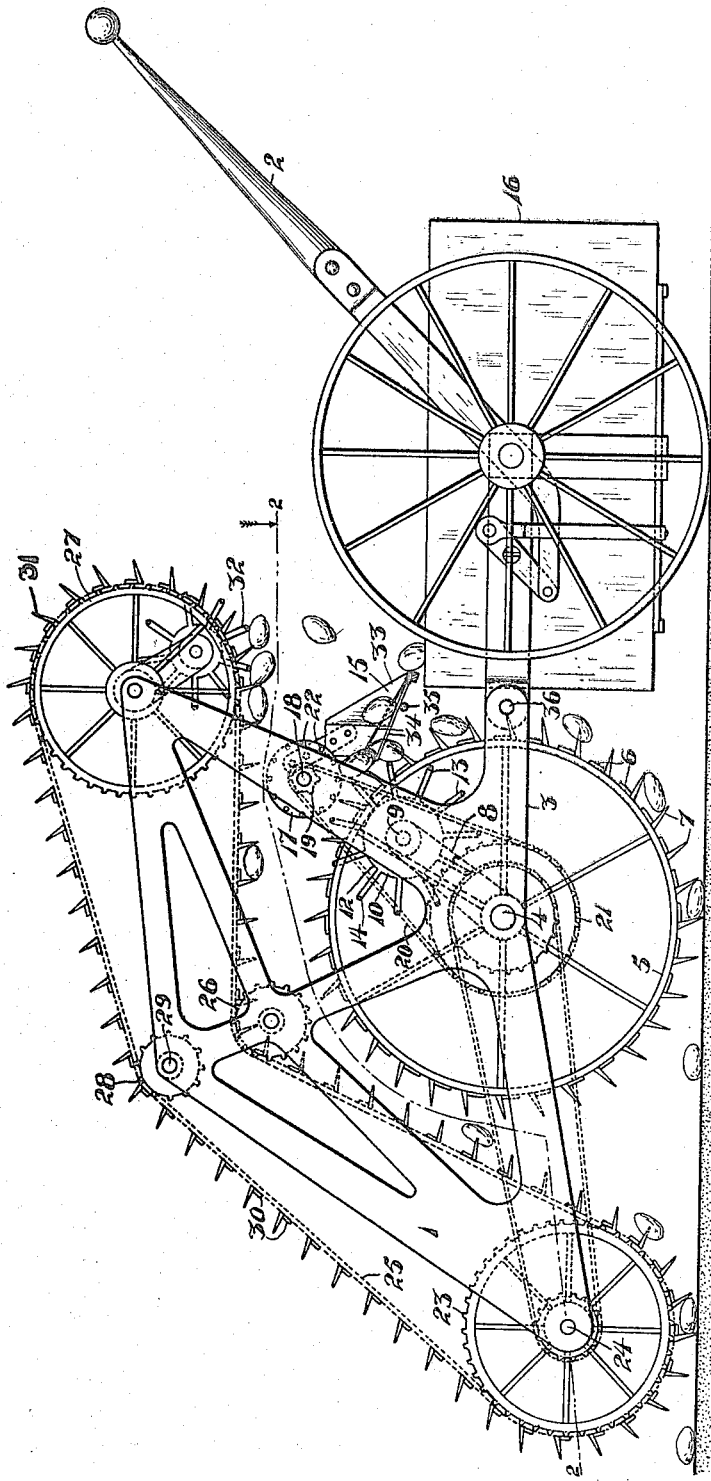

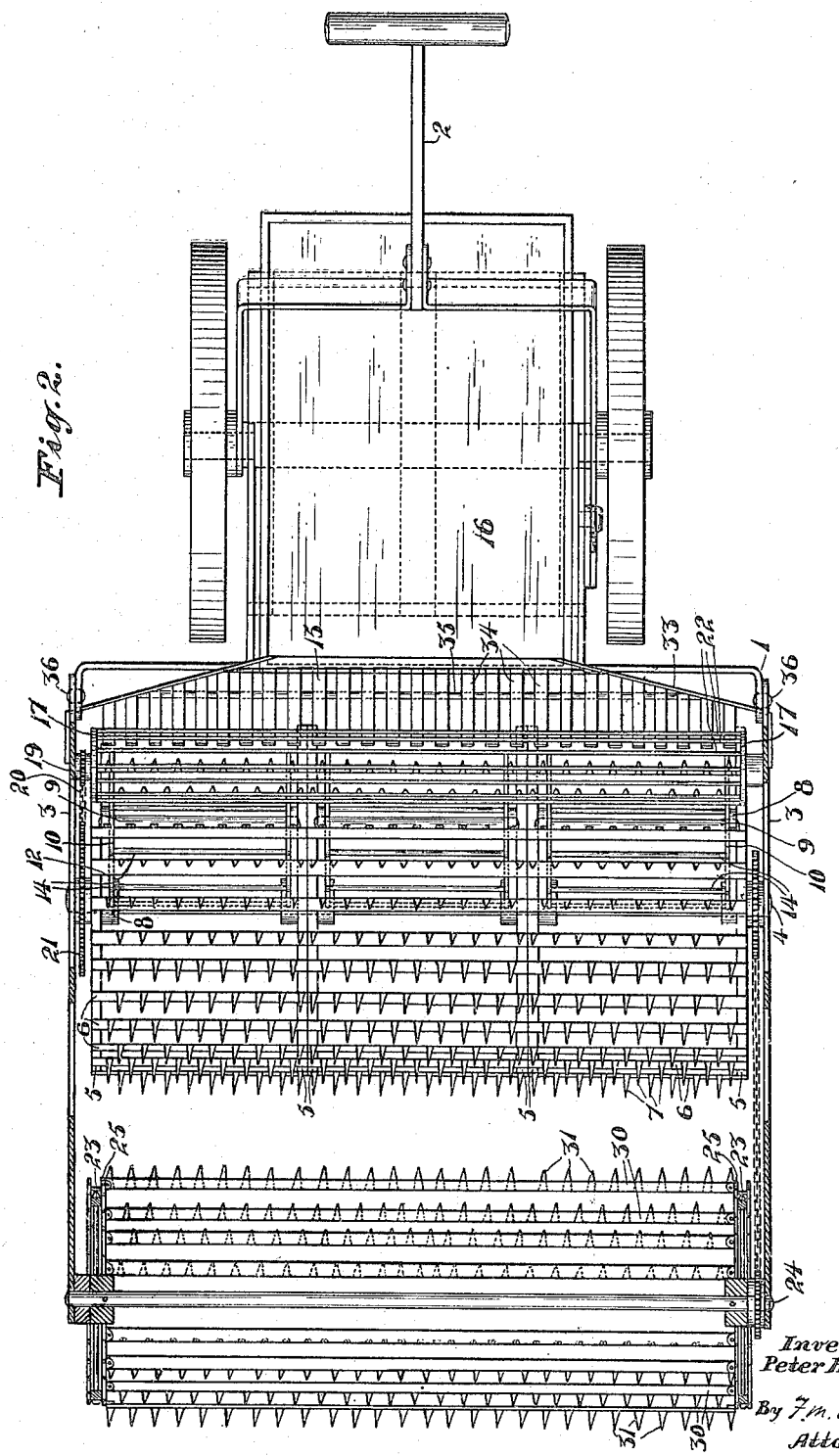

PETER H. LINT, OF LOS GATOS, CALIFORNIA.

FRUIT-GATHERER.

1,222,878.

Specification of Letters Patent.    Patented Apr. 17, 1917.

Application filed July 21, 1915.   Serial No. 41,087.

*To all whom it may concern:*

Be it known that I, PETER H. LINT, a citizen of the United States, residing at Los Gatos, in the county of Santa Clara and State of California, have invented new and useful Improvements in Fruit-Gatherers, of which the following is a specification.

The present invention relates to machines for gathering prunes and other fruit from the ground. One object of the invention is to provide a machine of this character of very simple construction, and which will operate without the undue expenditure of power, thus enabling the machine to be operated continuously and easily by one man.

A further object is to provide a machine containing two separate gathering devices operating over the same ground in succession, so that if the first gathering device should fail to pick up the fruit, it will be picked up by the second.

A further object is to provide a machine which will accommodate itself to the inequalities of the ground.

A further object of the invention is to provide a machine containing means for gently removing the fruit from the gathering mechanism, so as to avoid bruising or otherwise injuring the fruit.

In the accompanying drawing, Figure 1 is a side view of my improved fruit gathering machine; Fig. 2 is a sectional view on the line 2—2 of Fig. 1.

Referring to the drawing, 1 indicates a suitable frame supporting all the shafts of the machine, and including a handle 2 by which the machine can be propelled by a single operator.

Said frame comprises side bars 3, between mediate portions of which is secured a fixed shaft 4, on which are rotatably mounted at intervals a series of pairs of heads 5, said heads being connected in pairs at equal intervals around their circumferences by bars 6, thus forming roller segments, said bars 6 having extending obliquely therefrom picker teeth 7 which, from a bar adjacent to the ground, extend rearwardly downward. Fixedly secured to said shaft 4 between each pair of heads thereon and adjacent to the respective heads of the pair are the lower ends of arms 8, which extend from said shaft upwardly and rearwardly to points within the circumference of the roller and are connected at their outer ends by extruder shafts 9. On each extruder shaft are mounted heads of an extruder wheel 10, said heads each comprising a disk 12 and teeth 13 extending radially outward from the circumference of said disk, their free ends being connected by parallel rods 14. The disk-shaped portions of the heads do not extend outside the roller segments, but, as the bars 6 which form the circumference of the roller segment revolve, they pass into the space between the teeth of the extruder heads and advance the same, and thereby cause the extruder wheels to rotate with the roller segments. As the roller segments and extruder wheels rotate in unison, the bars move inwardly between the teeth 13 of the extruder heads until their inner edges approach closely to the disk-shaped portions 12 of said heads, the outer ends of the picker teeth 7 of the bar being then substantially flush with the rods 14 carried by the outer ends of the teeth 13 of the extruder wheel. It will thus be evident that any fruit that has been impaled upon the picker teeth 7 of, or pressed between, the bars will, by said rods 14, be gradually and easily moved off from said teeth 7, until, when the outer ends of the teeth are flush with the rods, the fruit is completely removed therefrom. Thereafter, in the continual revolution of the roller and the extruder wheel, the bars 6 move out of the space between the teeth of the extruder wheel and eventually entirely leave said wheel.

It will be observed that, by this mechanism, the extruder wheel is rotated automatically by the rotation of the roller, and without any gearing for that purpose, but simply by the pressure of the bars 6 against the teeth of the extruder wheel.

The fruit, on being removed from the picker teeth 7, drops on to a chute 15 carried by the frame and slides down said chute into a box 16. However, should the fruit remain hanging upon the picker teeth 7, I provide a squirrel-cage-shaped remover 17 rotatable upon a shaft 18 mounted in bearings in the frame 1 and having a pinion 19 around which travels a sprocket chain 20 around a sprocket wheel 21 secured to a head of the roller. The rods 22 of this remover passing in a circular path adjacent to the teeth 7 of the bars, and in the opposite direction thereto, positively remove the fruit which may have remained upon said teeth.

In order to avoid the necessity of operating the machine a second time over the same ground for the purpose of picking up any fruit that may not have been gathered in the first operation, I provide in front of the roller an auxiliary gatherer consisting of two pairs of sprocket wheels 23 on a shaft 24 mounted in bearings in the frame 1. Around these sprocket wheels travel sprocket chains 25 which also travel around pairs of idle sprocket wheels 26, 27 mounted upon shafts in the frame and then around a pair of sprocket wheels 28, also mounted upon a shaft 29 in the frame. Said chains are connected by parallel bars 30 having extending therefrom picker teeth 31, which, when the bars are close to the ground, extend downwardly and rearwardly from said bars. They thus perform the same function of picking up the fruit lying upon the ground as is performed by the picker teeth on the roller bars, and convey said fruit into proximity with an extruder 32 which is located over the box 16, is constructed similarly to the extruder 11, and is operated in the same manner, the bars 30 rotating said extruder in the same manner as the extruder 11 is rotated by the bars 6.

The chute 15 is formed with a frame 33, and has a bottom formed of strips 34 of metal, pivotally attached at their lower ends to the frame 33, and resting upon a cross bar 35 at a distance from the pivotal point. When fruit impaled upon the picker teeth impinges against the bottom of the chute, it will raise said strips 34 and pass by the same. At the same time fruit falling from the extruder or remover on to the chute will roll down said chute into the receptacle therefor.

I claim:—

1. In a machine for gathering fruit and the like from the ground, the combination of parallel bars having picker teeth, means for supporting said bars and for guiding them in succession into proximity with the ground, and an extruder rotatable about an axis eccentric to the path of the bars, and comprising pushers parallel with the bars and arranged to intervene respectively between successive pairs of bars.

2. In a machine for gathering fruit and the like from the ground, the combination of parallel bars having picker teeth, means for supporting said bars and for guiding them in succession into proximity with the ground, and a rotary extruder comprising pushers parallel with and of less length than the bars, and supports for the pushers rotatable about an axis within and eccentric to the path of the bars.

3. In a machine for gathering fruit and the like from the ground, a roller having at its circumference longitudinally extending bars formed with picker teeth, fixed supports within the roller, and an extruder wheel within the roller, rotatably supported by said supports and having pushers, parallel with, and arranged to intervene respectively between, said bars.

4. In a machine for gathering fruit and the like from the ground, a roller having at its circumference longitudinally extending bars formed with picker teeth, fixed supports within the roller, an extruder wheel rotatably mounted on said supports, and the ends of which have outwardly extending fingers, and longitudinal bars connecting the outer ends of said fingers.

5. In a machine for gathering fruit and the like from the ground, a shaft, a roller loosely mounted on said shaft and having at its circumference longitudinally extending bars formed with picker teeth, arms fixedly extending from said shaft within the roller, a shaft connecting the outer ends of said arms, an extruder wheel mounted on said shaft, the ends of which have outwardly extending fingers, and longitudinal bars connecting the outer ends of said fingers.

6. In a machine for gathering fruit and the like from the ground, a shaft, a roller loosely mounted on said shaft and having at its circumference longitudinally extending bars formed with picker teeth, arms fixedly extending from said shaft within the roller, a shaft connecting the outer ends of said arms, an extruder wheel mounted on said shaft the ends of which are formed with disks, and fingers extending outwardly therefrom, and longitudinal bars connecting the outer ends of said fingers.

7. In a machine for gathering fruit and the like from the ground, a shaft, a roller loosely mounted on said shaft and having at its circumference longitudinally extending bars formed with picker teeth, arms fixedly extending from said shaft within the roller, a shaft connecting the outer ends of said arms, an extruder wheel mounted on said shaft the ends of which are formed with disks and fingers extending outwardly therefrom, longitudinal bars connecting the outer ends of said fingers, and a squirrel-cage-shaped remover outside of, and adjacent to, said roller.

8. In a machine for gathering fruit and the like from the ground, the combination of a frame, a roller mounted therein, picker teeth carried thereby, an extruder for extruding the fruit from said picker teeth, endless chains, picker teeth carried thereby, pairs of sprocket wheels around which the chains travel and supported by said frame, one of said pairs of sprocket wheels extending in proximity to the ground, an extruder adjacent to the other sprocket wheel, and a box into which the fruit descends when discharged by either extruder.

9. In a machine for gathering fruit and the like from the ground, the combination of a frame, a roller mounted therein, picker teeth carried thereby, an extruder for extruding the fruit from said picker teeth, endless chains, picker teeth carried thereby, pairs of sprocket wheels around which the chains travel and supported by said frame, one of said pairs of sprocket wheels extending in proximity to the ground, an extruder adjacent to the other sprocket wheel, a box into which the fruit descends when discharged by either extruder, and means for rotating said remover in the opposite direction to said extruder wheel.

In testimony whereof I have hereunto set my hand in the presence of two subscribing witnesses.

PETER H. LINT.

Witnesses:
FRANCIS M. WRIGHT,
D. B. RICHARDS.

Copies of this patent may be obtained for five cents each, by addressing the "Commissioner of Patents, Washington, D. C."